Figure 1:
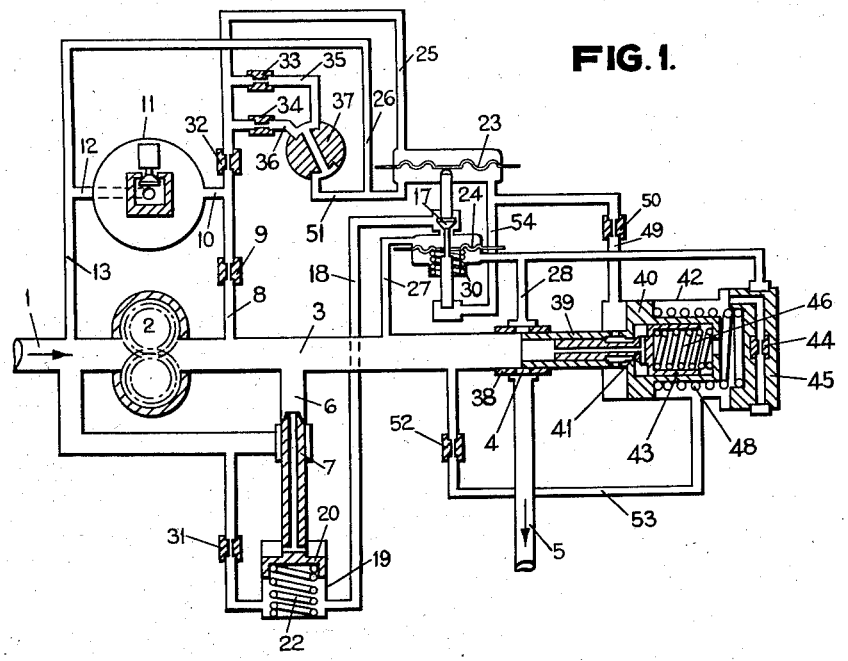

Feb. 24, 1959   D. G. BOOTH ET AL   2,874,764
SPEED CONTROL FOR COMBUSTION ENGINES AND TURBINES
Filed March 11, 1953

Inventors:-
Douglas Gerhard Booth,
Robert Spurgeon Wood,
By:- William E. Bayly
Attorney.

United States Patent Office 2,874,764
Patented Feb. 24, 1959

2,874,764
SPEED CONTROL FOR COMBUSTION ENGINES AND TURBINES

Douglas Gerhard Booth, Ilford, and Robert Spurgeon Wood, Chadwell Heath, Romford, England, assignors to The Plessey Company Limited, Ilford, England, a British company Application March 11, 1953, Serial No. 341,638

6 Claims. (Cl. 158—36.4)

The present invention relates to a system and means for controlling the supply of liquid fuel to internal combustion engines and gas turbines to control the speed thereof.

The object of the present invention is to obtain accurate speed control of an internal combustion engine or turbine over a wide range of operating conditions, the system being applicable for example to gas turbine propulsion units of aircraft which are subjected to extremely varied operating conditions, for example, those resulting from changes of altitude.

According to the present invention a system is provided which will operate to control the fuel supply to maintain the engine at a desired speed irrespective of changes in operating conditions e. g. due to changes in forward speed of the aircraft, atmosphere density and temperature, calorific value and density of the fuel combustion efficiency and turbine efficiency.

In the system according to the present invention the regulation of the liquid fuel flow is effected in two stages:

A primary stage where the control of flow is achieved by variation in the pressure drop across a metering orifice about a mean or normal value such that a deviation in engine speed from its set value produces a change in fuel flow approximately inversely proportional to the deviation in speed.

This primary stage is rapid in operation and is designed to cater for transitory deviations in operating conditions.

The secondary stage operates by varying the size of the aforementioned metering orifice in a direction to restore the mean or normal pressure across that orifice.

This secondary stage is relatively slow in operation and caters for changes other than those of a transitory nature.

Alternatively the primary stage can vary the size of the metering orifice rapidly and the secondary stage vary the pressure drop across it in a relatively slow manner.

In the present invention the primary stage of the control is effected by maintaining constant the sum of two forces, one of the forces being produced by the application of a pressure which is a function of the square of the engine speed, and the other force being produced by the application of the pressure drop existing across the metering orifice.

Thus an increase in engine speed can be made to cause a reduction in the pressure drop across the metering orifice, with a corresponding drop in flow. By selection of different factors, considerable variation in the degree of correction of fuel flow can be obtained.

The secondary stage of the control is effected by varying the size of the metering orifice by a servo mechanism under the control of a pilot device which is sensitive either to the speed controlled pressure or to a pressure drop derived from the application of the speed controlled pressure.

This change in size of the metering orifice is made in a direction which will tend to restore the pressure drop to its mean or normal value. The size of the metering orifice is controlled to change at a rate proportional to the deviation of the speed controlled pressure from its steady running value.

Any desired speed can be selected by varying the effect in the primary stage of the force derived from the speed controlled pressure.

Thus a decrease in the effect of the speed controlled pressure will cause the primary stage of the control to increase the fuel flow so that the force arising from the greater pressure drop across the metering orifice will restore the sum of the two forces to its original value. This decrease in the effect of the speed controlled pressure will also cause the metering orifice pilot valve to actuate the servo mechanism to increase the size of the orifice. This function is called the secondary stage of the control. The continual increase in flow resulting from a higher pressure drop impressed across the expanding metering orifice will cause the engine to accelerate until the increased force resulting from the higher speed controlled pressure requires a reduction of the force resulting from the pressure drop across the metering orifice sufficient to restore it to its mean or normal value. This will cause the expansion of the metering orifice to be halted and the speed of the engine will now be maintained constant at an increased value.

The invention will now be described with reference to the accompanying drawings.

Figure 2:
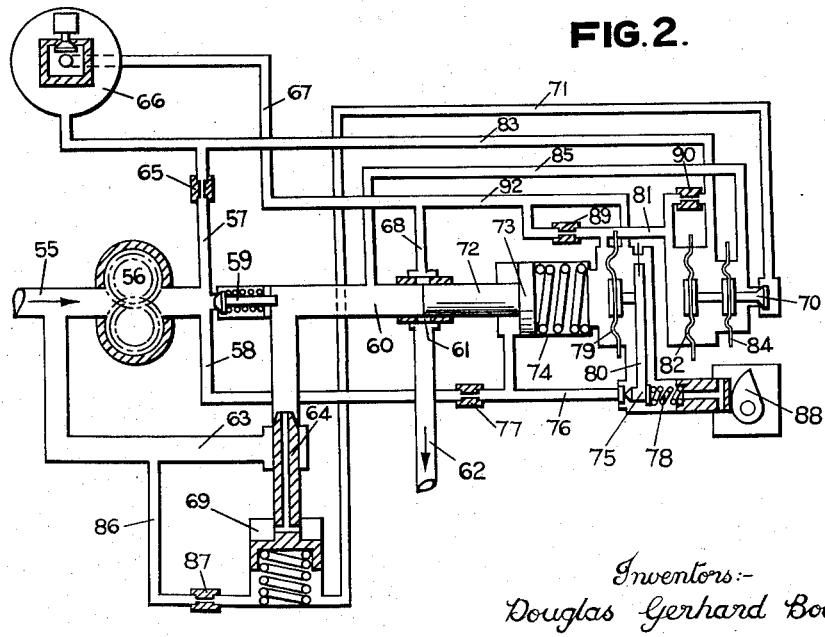
Figure 3:
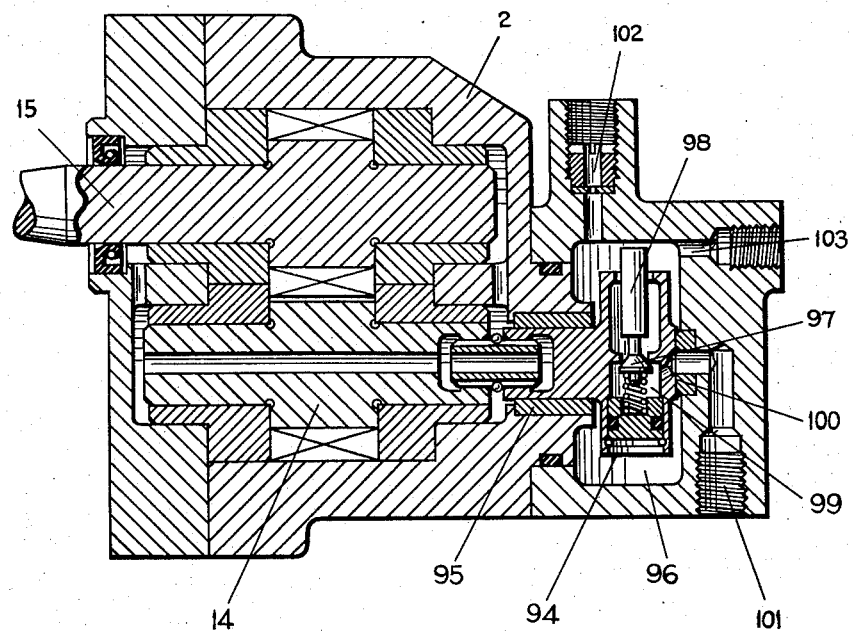

Fig. 1 shows one embodiment,
Fig. 2 shows another embodiment and
Fig. 3 illustrates an embodiment of a combined pump and centrifugal relief valve.

Referring to Fig. 1, liquid fuel is supplied through an inlet passage 1 to a fixed displacement pump, for example, a gear pump 2, a main fuel supply passage 3 through a metering orifice 4, to the fuel burner passage 5. Excess fuel is passed back to the inlet passage 1 by way of a branch passage 6 containing a servo-operated by-pass valve 7.

Liquid fuel from the main fuel supply passage 3 also flows through a branch pipe 8, containing an orifice 9, and branch passage 10, to a centrifugally loaded relief valve 11. The outlet from the relief valve 11 is connected by way of conduits 12 and 13 with the fuel inlet passage 1. Said relief valve 11 in practice is adapted to be coupled to the pump-gear shaft 14 (Fig. 3) and the other pump-gear shaft 15 is adapted to be coupled to an engine (not shown) to which the system is applied. As this relief valve 11 is supplied with liquid fuel from the main supply passage 3, it can control the pressure of a quantity of fuel, between the limits of the supply and outlet pressure, at a value proportional to the square of the speed of rotation.

A relay valve 17 controls the admission of fluid from supply passage 3 through conduits 27 and 18 to the lower end of a servo cylinder 19 containing a piston 20 to which the by-pass valve 7 is attached. Said piston 20 has the main fuel supply pressure acting on its upper side through an axial bore of the valve 7 and the servo pressure from the relay valve 17 plus the load of a helical spring 22 acting on the other side. As will be shown further below, the relay valve 17 is actuated by the combined effect of the speed controlled pressure from the centrifugal relief valve 11 and the pressure drop across the metering orifice 4, and the servo-operated by-pass valve 7 in conjunction with the relay valve 17 serves as the primary stage of the control part of the fuel system as hereinafter set forth.

The stem of the relay valve 17 is provided with two diaphragms 23 and 24. One side of diaphragm 23 has a speed controlled pressure connected to it by conduit 25 and the other side of the diaphragm is connected to pump intake by conduits 26 and 13. The pressure acting on the underside of the diaphragm 23 is connected by conduit 54 to an extension of the stem of the valve 17 so that the effective areas of both sides of diaphragm 23 are equal. The diaphragm 23 will thus tend to close the relay valve 17 as the speed controlled pressure rises. The other diaphragm 24 has the pressure drop across the metering orifice 4 applied to it. One side being connected by conduit 27 with the main supply passage 3 at the upstream side of the metering orifice 4, and the pressure on the other side of said diaphragm 24 is connected by way of conduit 28 and branch passage 29 to the downstream side of the metering orifice 4 in such a way that an increase in the pressure drop through the metering orifice 4 tends to close the relay valve 17. Under steady running conditions the loads from these two diaphragms 23, 24 are balanced by a spring 30 tending to open the relay valve 17.

An increase in engine speed will cause the load on the diaphragm 23 produced by the speed controlled pressure to increase, and so tend to close the relay valve 17. This reduces the supply of fluid to the servo cylinder 19, which is bled to pump inlet via a restriction 31. The pressure on one side of the piston 20 therefore falls, and the main fuel supply pressure acting on the other side of the piston 20 causes it to move opening the by-pass valve 7, which compresses the spring 22, and fluid displaced by the movement of said piston 20 passes out through orifice 31 to passage 6, so that valve 7 will open the by-pass and thus operate to cut down the flow of fuel through the metering orifice 4. This will result in a diminished pressure drop through the metering orifice 4 and this lower pressure drop acts on the second diaphragm 24 of the relay valve 17 and reduces the load tending to close it. When the sum of the forces arising from the speed controlled pressure and the metering orifice 4 pressure drop become equal to the spring load, the relay valve 17 will be in a new state of balance.

In this way an increase in speed will result in a proportionate reduction in the fuel supplied to the engine by the first stage of the control. The secondary stage, by which the engine speed is reset to its correct value, is described further below.

In order to change the speed at which the engine is governed, it is necessary to alter the influence of the speed controlled pressure on the relay valve 17, so that the speed controlled diaphragm 23 can still exert the same force on the relay valve 17 at the different speed. One method of achieving this is to connect the high pressure side of the centrifugally loaded relief valve 11 through an orifice 32 in conduit 25 and thence selectively through either or both of orifices 33, 34 in the respective inter-communicating branch passages 35, 36 to the low-pressure side of valve 11. The pressure existing between two of these orifices 32, 33 or 32, 34 and the said low pressure side will bear a fixed relationship to the pressure applied across the series of orifices. The proportion of the total pressure so obtained may be varied by selection of the orifices used, and for this purpose the branch passages 35, 36 are interconnected by a rotary selector valve 37.

The metering orifice 4 is in the form of a suitably shaped port cut in the side of a cylindrical sleeve 38, the area of the port being variable by means of a servo-operated plunger 39 sliding within the sleeve 38 and connected to a piston 40. The movement of this piston 40 is controlled by a hollow resetting valve 41 for regulating the flow of fluid to the left-hand side of the servo cylinder 42. Said resetting valve 41 is operated by a piston 43 of which one side is supplied with liquid fuel through the hollow stem of said valve 41 from the main fuel passage 3 on the upstream side of the metering orifice 4 while the other side of piston 43 is connected to the downstream side of the metering orifice 4 through an orifice 44 arranged in the cylinder head 45, serving as an acceleration control, as hereinafter set forth. When the pressure drop through the metering orifice 4 is at its mean or normal value, the resetting valve 41 is held in balance in a partly open position, by a spring load 46 on the low pressure side of piston 43. If owing to the action of the primary stage of the control the pressure drop through the metering orifice 4 increases, the resetting valve 41 will move to increase the flow of fluid from passage 3 through the hollow stem of valve 41 to the left-hand side of the cylinder 42, thereby moving servo piston 40 and plunger 39 attached thereto to uncover a larger area of the metering orifice 4 and so restore the pressure drop through it to its mean or normal value. This operation is termed the secondary stage of the control. The rate at which the servo piston 40 moves is controlled by connecting the other side of the servo piston 40 to the low pressure side of the piston 43. As the servo piston 40 moves, it displaces fluid through the acceleration control orifice 44 and the rate of this displacement modifies the pressure acting on the piston 43. Thus when the pressure drop across the metering orifice 4 is much less than the mean or normal value, there will be a relatively large force tending to close the resetting valve 41 and so cut off the supply of fluid to the left-hand side of servo cylinder 42. A spring 48 located in cylinder 42 provides a load to urge the piston 40 to the left; the left-hand side of the cylinder 42 is connected to low pressure through conduit 49 with an orifice 50. The servo piston 40 will thus move in a direction to decrease the area of the metering orifice 4 at a rate proportional to the deviation of the actual pressure drop across it from the mean or normal value.

In order to obtain stable governing, it is essential that no air is trapped in the metering orifice servo cylinder 42. To ensure this, a continuous flow of fluid is maintained through the cylinder 42 supplied via an orifice 52 in passage 53 connected to the upstream side of the metering orifice 4, this fluid and any entrained air passing out of the cylinder 42 through the acceleration control orifice 44.

Referring to the construction shown in Fig. 2, liquid fuel is supplied through inlet passage 55, gear pump 56, a non-return valve 59, main fuel passage 60, and metering orifice 61 to a fuel burner passage 62. Excess fuel is returned to the inlet passage 55 through passageway 63 containing a by-pass valve 64.

A branch passage 57 from pump delivery has an orifice 65 and serves as an inlet to a centrifugal relief valve 66 and a conduit 67 leads from said valve 66 via branch passage 68 to the fuel-burner passage 62 downstream of the metering orifice 61.

A spring loaded non-return valve 59 is incorporated in the main fuel passage 60 downstream of the branch passage 57 to enable sufficient pressure to be supplied to the centrifugal relief valve 66 at low engine speeds.

The means for effecting the primary stage of the control consist of the by-pass valve 64 actuated by a servo cylinder 69 which is controlled by a relay valve 70 having a large diaphragm 82 and a smaller diaphragm 84 by way of conduit 71 in a way which will be described further below.

The means for effecting the secondary stage of the control consist of the metering orifice 61 the effective area of which is varied by means of a spring loaded plunger 72 sliding within it. The plunger 72 is actuated by a piston 73 working within a servo cylinder 74. This servo piston 73 is controlled by a metering orifice control valve 75 that is supplied with fluid from pump delivery pressure via conduit 76 having orifice 77 and conduit 58. This valve 75 which is urged to close by an adjustable spring load 78 is coupled to a diaphragm 79 by means of a lever 80. One side of the diaphragm 79 and also one side of the metering orifice piston 73, is connected by conduit 81 to the outer side of the larger diaphragm 82 attached to the relay valve 70.

The speed controlled pressure, which is regulated by the centrifugally controlled relief valve 66 and the orifice 65, is connected via conduit 83 to the space between the diaphragm 82 and 84 of the relay valve 70. The outer side of small diaphragm 84 and the inlet side of the relay valve 70 itself, are connected to the upstream side of the metering orifice 61 by way of conduit 85.

Under steady running conditions the relay valve 70 is held in balance by the three pressures acting on its two diaphragms 82 and 84.

In order to permit the speed at which the engine is governed, to be changed the spring load 78 on the metering orifice control valve 75 is shown as being adjustable by a cam 88.

Assuming that the engine has been running steadily at a speed determined by the setting of the cam 88, and that the load decreases, the first effect will be a tendency for the engine speed to increase.

This increase in engine speed will cause a greater centrifugally controlled pressure to act on the difference in area of the two diaphragms 82 and 84 of the relay valve 70 tending to close the relay valve 70. This will reduce the rate of flow of servo fluid through conduit 71, orifice 87 and passage 86 to low pressure and thereby the pressure at the lower end of the servo cylinder 69. The pressure acting on the other end of this cylinder will therefore cause the by-pass valve 64 to open and thus reduce the flow of fuel through the metering orifice 61, resulting in a diminished pressure drop through the metering orifice 61. The pressure difference acting on the smaller diaphragm 84 of the relay valve 70 and tending to close this valve differs from the pressure drop through metering orifice 61 only by the amount of the pressure drop across the governor 66, which latter, provided that the aperture 65 is not excessively narrow, is not affected by the decrease in the pressure drop across orifice 61 and will therefore also decrease according to the reduced flow through the orifice 61. Since the pressure difference across the large diaphragm 82 is exclusively determined by the fixed dimensions of apertures 89 and 90 and by the pressure drop across the governor 66, which latter, as already mentioned, is not affected by the decrease in flow through the orifice 61, this means that the total force tending to close the valve 70 will decrease as the flow through orifice 61, and thus the pressure drop across the last mentioned orifice, decreases. When the flow through the metering orifice 61 has decreased to a predetermined lower value, the relay valve 70 will reach a new state of balance. In this way an increase in engine speed results in a corresponding reduction in the fuel supplied to the engine.

This primary stage of the control will, however, leave the speed of the engine slightly in excess of the original value, since an increased pressure in conduit 83 is required to hold the relay valve 70 in its new state of balance.

It is the function of the secondary stage of the control to take up this slight change in speed and to restore the relay valve to its original state of balance. This is effected in the following way. The pressure between conduits 83 and 92 which, as mentioned above will, due to the slightly increased engine speed, be at a value slightly in excess of that corresponding to the original engine speed, produces a correspondingly increased flow through orifices 90 and 89, thereby increasing the difference between the pressure in conduit 81 connecting these two orifices and the pressure in conduit 92. This increased pressure difference between conduits 81 and 92 acts on the diaphragm 79 of the metering orifice control valve 75 in a direction to increase the opening of valve 75. This reduces the pressure in conduit 76, to which servo fluid is supplied via the orifice 77, so that the piston 73 will move in a direction to reduce the opening of the metering orifice 61. This movement takes place at a controlled rate, because the displaced fluid must pass through valve 75, and in addition, the movement of the piston to the left requires fluid to be admitted into the right hand side of the cylinder 74 through the metering cylinder control orifice 90 and therefore results in an increased pressure drop through the orifice 90 in order to provide the extra volume of fluid. This lowers the pressure acting on the left hand side of the diaphragm 79. Too rapid movement of the piston 73 therefore would reduce the opening of the valve 75 so that the movement of the piston 73 is automatically controlled.

As this controlled movement of the piston 73 continues, the reduction in area of the metering orifice 61 cuts the fuel supply to the engine, and thereby reduces engine speed, until the effect of the falling speed-controlled pressure from the centrifugally loaded relief valve 66 balances the effect of the increasing pressure drop through the metering orifice 61. The movement of the metering orifice piston 73 will then cease and the relay valve 70 will have regained its original state of balance with the pressures acting on the diaphragm 82 and 84 being equal.

If it is required to select a higher speed, the speed control cam 88 is moved to increase the load of the spring 78 on the metering orifice control valve 75 and so reduce the flow through it. This reduced flow causes a lesser pressure drop through the metering cylinder supply orifice 77 in conduit 76 and so permits a greater pressure to act on the metering orifice servo piston 73. This causes the piston 73 to move in a direction to increase the area of the metering orifice 61 and this movement of the piston 73 displaces fluid from the cylinder 74 through an orifice 90 referred to as the metering control orifice.

This flow through the metering cylinder control orifice 90 will cause an increased pressure to act on the diaphragm 79 of the metering orifice control valve 75 and also on the larger diaphragm 82 of the relay valve 70.

The first mentioned effect of this pressure acting on diaphragm 79 through lever 80 serves to oppose the spring load 78 and so reduce the rate of opening of the metering orifice 61. The second effect, the increased pressure on the larger diaphragm 82 of the relay valve 70 causes same to open and permit a greater flow of servo fluid via conduit 71 to the by-pass valve servo cylinder 69. This causes the by-pass valve 64 to close and increase the pressure drop through the metering orifice 61 until the increased pressure acting on the smaller diaphragm 84 of the relay valve 70 balances the load on the larger diaphragm 82.

Thus an increased pressure drop is impressed across the expanding metering orifice 61 and the resultant increasing flow of fuel to the engine will cause it to accelerate. This rate of acceleration will continue until the higher speed of rotation of the centrifugal relief valve 66 raises the value of the speed controlled pressure to a point where the sum of the force produced by the speed controlled pressure acting on the difference in area of the two diaphragms 82 and 84 and the force due to the metering pressure acting on the smaller diaphragm 84 of the relay valve 70 overcomes the force produced by the back pressure from the servo cylinder 74 acting on the larger diaphragm 82 and so reduces the opening of the relay valve 70.

The metering orifice 61 will continue to expand until the centrifugally controlled pressure becomes equal to the back pressure in the servo cylinder 74. This final increase in the speed controlled pressure allows the relay valve 70 to resume its state of balance, as the pressure drop through the metering orifice 61 will have decreased by a certain amount from its accelerating value to its new steady running value. In this condition the three pressures acting on the diaphragms 82 and 84 of the relay valve 70 will be equal to one another and their value, measured from the datum of the pressure on the downstream side to fuel burner passage 62 of the metering orifice 61 will be a function of the load of the speed control spring 78.

In order to obtain stable governing it is essential that no air be trapped in the part of the servo cylinder 74 connected to the relay valve. To this end the orifice 89 is situated at the highest level of the servo cylinder 74 and is connected to the downstream side of the metering orifice 61 by way of conduit 92. A small flow will pass through this orifice 89 fed via the metering cylinder control orifice 90 that will entrain any air bubbles that may get into the servo cylinder 74.

Referring to Fig. 3 which shows a unitary construction of the pump and centrifugal relief valve; the centrifugal relief valve consists of a rotary member 94 mounted in a bearing 95 adapted to be driven by the engine which it is required to govern.

In Fig. 3, the rotary member 94 is connected to the driven shaft 14 of the gear pump 2. This member 94 rotates within a chamber 96 and carries a valve 97 provided with a stem 98 serving as a weight which under the action of centrifugal force urges the valve 97 against its seat. As long as there is any fluid passing through the valve 97 the pressure at the centre of the chamber 96 will be proportioned to the centrifugal force acting on the valve stem.

The fluid passes through the valve 97 into a rotary chamber 99 from which it passes through the rotary seal 100 to a low pressure connection 101. This low pressure provides the datum above which the centrifugally controlled pressure is measured. The chamber 96 is supplied with fluid from the pump delivery through an orifice 102.

The rotary member 94 is so shaped that it will cause the fluid within the chamber 96 to rotate at the same speed as itself. This will cause a centrifugal pressure difference between the fluid at the centre of the chamber 96 and the fluid at the periphery where the pressure pick-up point 103 is situated.

The centrifugally controlled pressure difference between the points 103 and 101 is thus the sum of the pressure drop through the valve 97 and the centrifugal pressure of the rotating fluid within the chamber 96.

Thus although an increase in density of the working fluid will cause the first mentioned part of the centrifugally controlled pressure to decrease due to the increased buoyancy effect on the valve stem 98, the second part of the pressure due to the centrifugal head of the fluid itself within the chamber 96 will increase. By suitably proportioning the valve these two variations can be made to cancel each other out at all speeds of rotation.

Thus the pressure difference measured between the points 103 and 101 is proportional to the square of the speed of rotation of the valve 97 and is not affected by variations in the density of the working fluid.

We claim:

1. A liquid fuel supply system for internal-combustion driven prime movers, comprising a constant-delivery fuel pump, a delivery line from said pump to the prime mover, an adjustable-size metering orifice in said line, a spill line branched off said delivery line upstream of said metering orifice, adjustable valve means in said spill line for varying the flow of fuel therethrough, first actuator means operable by fuel delivered from said pump for altering the adjustment of said valve means, further actuator means, also operable by fuel delivered from said pump, for altering the size of said metering orifice, means driven by the prime mover producing a pressure drop variable according to the speed of the prime mover, primary control means differentially responsive to said pressure drop and to the pressure drop across said metering orifice for controlling the supply of fuel from said pump to said first actuator means, a control chamber, a first restricted orifice connecting said control chamber with one point of the system, a second restricted orifice connecting said control chamber with another point of the system so chosen that the pressure difference between said first and second points varies according to the size of the metering orifice when said primary control means is in a state of balance, secondary control means for controlling the supply of fuel from said pump to said further actuator means, said secondary control means including a pressure-sensitive element responsive to variations of the pressure in said control chamber, and a movable abutment operatively connected to said further actuator means for common movement therewith to vary the effective volume of said control chamber according to the movement of said actuator means in such a direction as to counteract such pressure variations.

2. A system as claimed in claim 1, including means for adjustably loading the secondary control means.

3. A system as claimed in claim 1, wherein the pressure drop between the points to which the auxiliary chamber is connected by restricted orifices, is at least derived from the variable pressure drop produced by said means driven by the prime mover.

4. A system as claimed in claim 1, wherein the means for producing a pressure drop variable according to the speed of the prime mover include an auxiliary line branched off the delivery line upstream of the metering orifice and leading to a point at lower pressure, said auxiliary line including a valve device controlled by centrifugal means driven by the prime mover.

5. A system as claimed in claim 4, wherein the means for producing such variable pressure drop also include flow-varying means comprising a plurality of fixed aperture orifices and means for selectively including such orifices in the auxiliary line.

6. A system as claimed in claim 4, wherein the centrifugally controlled valve device comprises a relief valve having a seat, a movable valve element co-operating with said seat, and a solid weight body driven for rotation about an axis to load said valve element by centrifugal action.

References Cited in the file of this patent

UNITED STATES PATENTS

| | | |
|---|---|---|
| 829,908 | Bush | Aug. 28, 1906 |
| 2,379,304 | Kalin | June 26, 1945 |
| 2,446,523 | Bradbury | Aug. 10, 1948 |
| 2,508,260 | Holley | May 16, 1950 |
| 2,594,689 | Sharp et al. | Apr. 29, 1952 |
| 2,616,507 | Greenland | Nov. 4, 1952 |
| 2,619,103 | Davies et al. | Nov. 25, 1952 |
| 2,627,906 | Johnson | Feb. 10, 1953 |